H. F. FISCHER.
DETACHABLE MILLING HEAD FOR SHAPERS.
APPLICATION FILED MAR. 29, 1920.
1,364,925.
Patented Jan. 11, 1921.
2 SHEETS—SHEET 1.
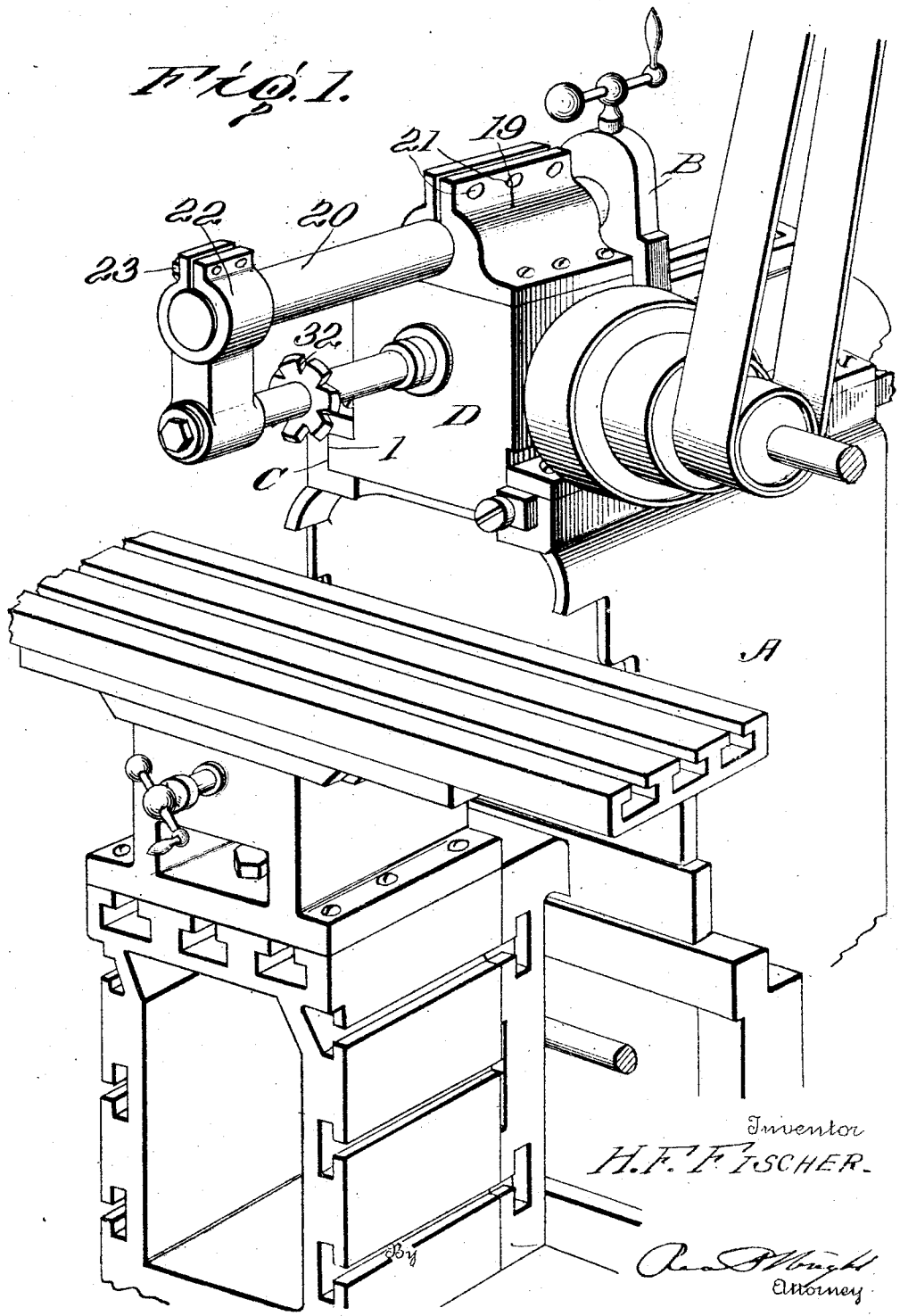

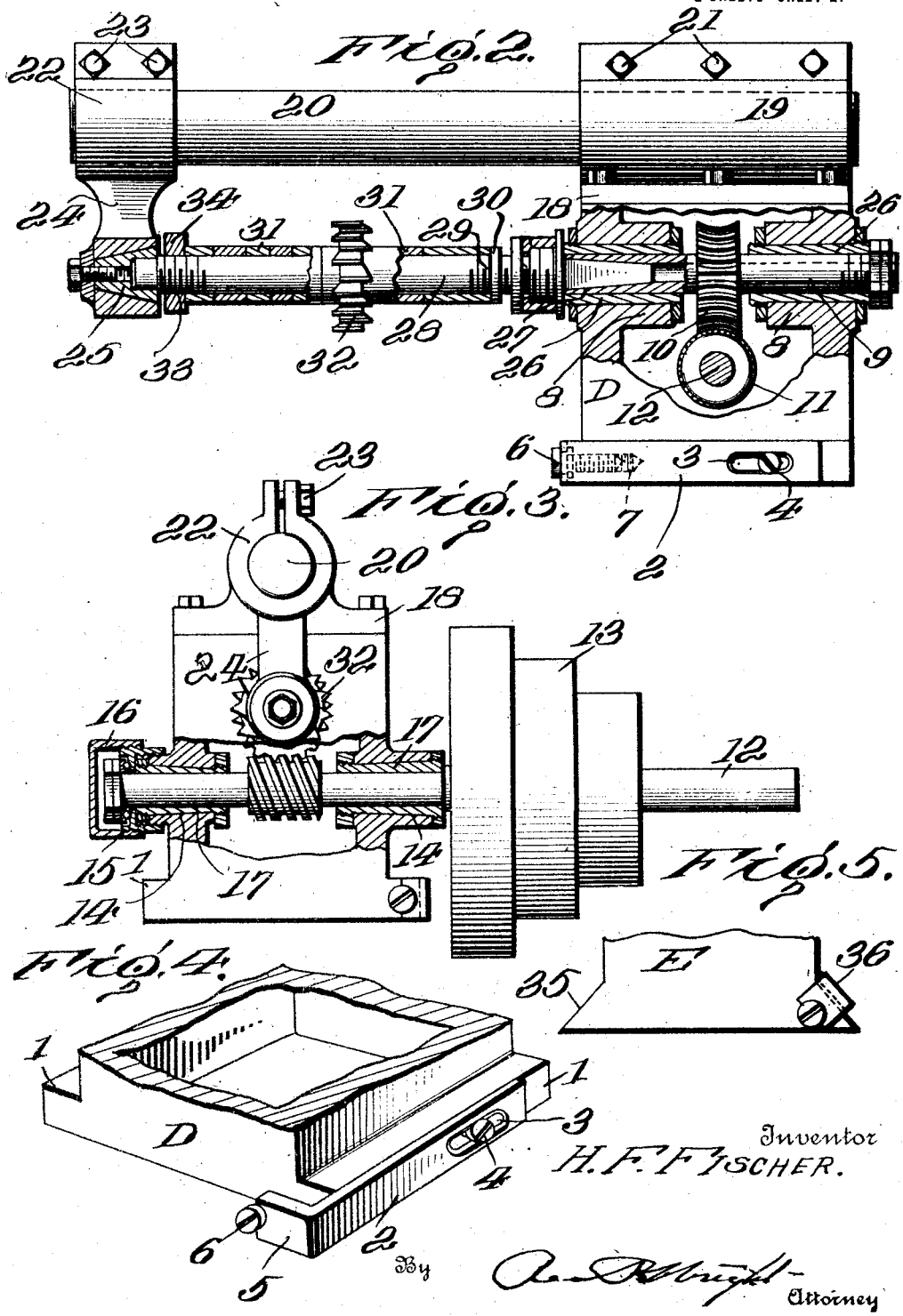

UNITED STATES PATENT OFFICE.

HENRY F. FISCHER, OF MEMPHIS, TENNESSEE, ASSIGNOR, BY DIRECT AND MESNE ASSIGNMENTS, OF ONE-FOURTH TO JOHN F. DOUTHAT, OF MEMPHIS, TENNESSEE, AND ONE-HALF TO SAM J. HOUSE, TRUSTEE, OF MEMPHIS, TENNESSEE.

DETACHABLE MILLING-HEAD FOR SHAPERS.

1,364,925.   Specification of Letters Patent.   Patented Jan. 11, 1921.

Application filed March 29, 1920. Serial No. 369,576.

*To all whom it may concern:*

Be it known that I, HENRY F. FISCHER, a citizen of the United States, residing at Memphis, in the county of Shelby and State of Tennessee, have invented certain new and useful Improvements in Detachable Milling-Heads for Shapers, of which the following is a specification, reference being had therein to the accompanying drawing.

This invention relates to a detachable milling head for shapers, the object being to provide a milling device which can be applied to any of the well known makes of shapers now in use without changing the construction of the shaper in any way whereby the shaper can be quickly converted into a milling machine.

Another object of my invention is to provide a milling head with means for clamping the same in position in the guide way of the ram or headstock so that the same will be held securely in position to be used as a milling device.

A still further object of the invention is to provide a milling head with a base corresponding in shape to the guide way of the ram of the shaper in connection with means for clamping or locking the head within the guide way.

Another and still further object of the invention is to provide a milling head which is exceedingly simple and cheap in construction and one which when mounted on the shaper can be driven by the same belt employed for driving the shaper whereby I am able to convert a shaper into a milling machine very quickly without removing or changing the construction of any of the parts of the shaper.

I am aware that I am not the first in the art to produce a combination metal working machine capable of performing the function of a shaper or a milling device but in prior devices the shaper had to be especially constructed to allow the same to be converted into a milling device while with my invention any and all of the well known makes of shapers now in use can be converted into a milling machine by simply moving the ram back in the guide way to make room for the milling head and transferring the drive belt from the driving pulley of the shaper to the driving pulley of the milling device.

Other and further objects and advantages of the invention will be hereinafter set forth and the novel features thereof defined by the appended claims.

In the drawings,

Figure 1 is a perspective view of a portion of a shaper showing the application of my improved construction of detachable milling head.

Fig. 2 is a side elevation, partly in section, of my improved construction of milling head.

Fig. 3 is a section taken at right angles to Fig. 1, partly in elevation.

Fig. 4 is a detail view of the base of the head showing the manner of securing the same to the shaper, and Fig. 5 is a detail view of a slightly modified form of guide flange for the head.

In the drawings A indicates a shaping machine of the well known construction now in use which is provided with an adjustable ram or headstock B slidably mounted within the guide way C adapted to carry the tool to work on the material carried by the table in a well known manner. The ram or headstock is moved back in the guide way and my improved construction of detachable milling head D is placed in the guide way and by shifting the belt from the step pulley of the shaper to the driving pulley of the milling head the shaper is quickly converted from a shaper to a milling machine.

My improved construction of milling head D comprises a rectangular body provided with a base having guide flanges 1 corresponding in shape to the headstock guide way of the shaper in order to allow the same to be readily inserted in the guide way of the shaper after the ram or headstock has been moved back a sufficient distance to receive the head. One of the guide flanges 1 is provided with a clamping device 2 in the form of a wedge having a guide slot 3 working on a screw 4 secured in the flange as clearly shown. The clamping device 2 is provided with an angled bifurcated outer end 5 in which the grooved head of an adjusting screw 6 is mounted. The screw 6 works in a threaded bore 7 formed in the guide flange so that by turning the screw the wedging device can be moved in respect to the guide flange. After the head has been inserted in the guide way the adjusting screw is operated so as to clamp the head rigidly within the guide way. This construction provides means for clamping the head within the guide way quickly in order to allow the same to be readily inserted or removed.

The body of the head D is provided with bearings 8 in which is mounted a shaft 9 carrying a worm wheel 10 engaged by worm 11 carried by a shaft 12 which has an extension at one end provided with a stepped pulley 13 over which is adapted to pass a belt for driving the same. The shaft 12 is mounted in suitable bearings 14 formed in the head, the outer bearing being provided with a ball bearing 15 inclosed by a cap 16. The shaft 12 is preferably mounted in bushings 17 secured within the bearings 14, as clearly shown in Fig. 3.

The head D is provided with a cap 18 bolted in position on the head, as clearly shown, having a split collar 19 in which is clamped one end of an arm 20 by bolts 21, the arm 20 being provided with a split collar 22 clamped in adjusted position on the arm by bolts 23. The collar 22 is provided with a depending arm 24 in which is adjustably mounted a bearing 25.

The shaft 9 is journaled in bushings 26 arranged in the bearings 8 and is provided with a socket 27 into which extends the reduced portion of a shaft 28 which is provided with a threaded portion 29 on which is mounted a collar 30 adapted to be engaged by spacing sleeves 31, said sleeves surrounding the extension of the shaft 9, as clearly shown, for positioning the rotary cutter 32 forming the milling tool. The free end of the shaft is reduced and is mounted in the adjustable bearing 25, as clearly shown in Fig. 2, said shaft having a threaded portion 33 on which is arranged a collar 34 which engages the spacing sleeves. By forming these sleeves of different lengths, as clearly shown, the milling tool can be adjusted on the shaft in any desired position so that when the shaft is rotated it can be used for milling an article arranged on the shaper, and it will be noted that to one side of the rotary cutter I have arranged spacing sleeves of greater length than those arranged on the opposite side. The shaft 9 is held in its adjusted position within the bushings by nuts, as clearly shown.

In Fig. 5 the head E is provided with a guide flange 35 having a beveled face adapted to fit within a corresponding shaped groove of a shaper, said guide flange carrying a wedge shaped clamping member 36 constructed substantially as shown in the preferred form of my invention.

From the foregoing description it will be seen that I have produced a detachable milling head which is capable of being readily applied to any and all of the well known types of shaping machines now in use by simply moving the ram or headstock in its guide way into such a position that the guide way will receive the base of the detachable head which is provided with means for clamping it rigidly within the guideway. The milling tool is then in position to operate on the material mounted on the table and by shortening the belt employed for driving the shaper and placing the same over the step pulley of the head, the milling tool will be driven. My invention enables a machine shop having a shaper to transfer the shaper into a milling device easily and quickly whereby the shop is provided with a milling machine as well as a shaper at a very small expense.

What I claim is:—

1. The combination with a shaping machine provided with a guide way in which is slidably mounted a ram, of a milling head having a base corresponding in shape to the shape of the guide way inserted within said guide way and means for clamping said head within said guide way.

2. The combination with a shaping machine having a guide way in which is slidably mounted a ram or headstock, of a milling head inserted within said guide way, and means carried by said head for clamping the same in said guide way.

3. A milling head attachment for shapers comprising a body having a base provided with guide flanges corresponding in shape to the guide way of the headstock of said shaper, a tool carrying shaft mounted in said body, means for driving said tool carrying shaft and a wedge shaped member carried by said body for clamping said body within said guide way.

4. A milling head attachment for shapers comprising a body having a base provided with guide flanges, one of said guide flanges being provided with an adjustable wedge shaped member for clamping the same in position within the guide way of the headstock of the shaper.

5. A milling head attachment for shapers comprising a head provided with a rectangular body having a base provided with guide flanges corresponding in shape to the headstock guide way of the shaper, a driven shaft mounted in said head, a tool carrying shaft connected thereto, an arm, means for supporting the tool carrying shaft on said arm and a clamping device carried by said head for securing said head within the guide way of said shaper.

6. A milling head attachment for shapers comprising a body having a base provided with guide flanges corresponding in shape to the headstock guide way of the shaper, means for clamping said base within said guide way, a driven shaft having a step pulley mounted in said head, a shaft driven by said driven shaft, a tool carrying shaft connected to said driven shaft, a rotary cutter mounted on said tool carrying shaft and means for supporting the free end of said tool carrying shaft.

7. The combination of a shaping machine having a guide way in which the ram or headstock is adjustably mounted, of a milling head having a base corresponding in shape to said guide way and adapted to be inserted in one end of said guide way with its cutting tool in position to operate on the material carried by the table, means carried by said head for clamping the head within said guide way, and a step pulley mounted in said head for driving the tool carrying shaft of said head.

8. A milling head attachment for shapers comprising a body having a base provided with guide flanges adapted to fit within the guide way of the headstock of the shaper, a wedge shaped member slidably mounted on one of said guide flanges and a screw for adjusting said wedge shaped member for locking said head within said guide way.

9. A milling head attachment for shapers comprising a body having a tool carrying shaft and means for driving said shaft, said body having a base provided with guide flanges corresponding in shape to the guide way of the headstock of the shaper, a wedge shaped member slidably mounted on one of said guide flanges having an angled bifurcated end, a screw having a grooved slot working in said bifurcated end, said screw working in a threaded bore formed in said head for adjusting said wedge shaped member for locking said head rigidly within the guide way of said shaper.

In testimony whereof I have hereunto affixed my signature.

HENRY F. FISCHER.